United States Patent [19]

Allen et al.

[11] 4,133,384
[45] Jan. 9, 1979

[54] STEAM FLOODING HYDROCARBON RECOVERY PROCESS

[75] Inventors: Joseph C. Allen, Bellaire, Tex.; John W. Porter, Metairie, La.

[73] Assignee: Texaco Inc., New York, N.Y.

[21] Appl. No.: 826,446

[22] Filed: Aug. 22, 1977

[51] Int. Cl.² .................... E21B 43/24; E21B 43/22
[52] U.S. Cl. .................................. 166/272; 166/306
[58] Field of Search ............... 166/272, 274, 306, 256, 166/303, 263

[56] References Cited

U.S. PATENT DOCUMENTS

| | | | |
|---|---|---|---|
| 3,360,044 | 12/1967 | Lange | 166/272 |
| 3,406,755 | 10/1968 | Sharp | 166/256 |
| 3,439,743 | 4/1969 | Wylie | 166/272 |
| 3,554,286 | 1/1971 | Feuerbacher et al. | 166/272 X |
| 3,731,741 | 5/1973 | Palmer et al. | 166/272 |
| 3,860,597 | 1/1975 | Palmer et al. | 166/272 X |
| 4,026,359 | 5/1977 | Closmann | 166/272 X |
| 4,043,922 | 8/1977 | Palmer et al. | 166/272 X |

FOREIGN PATENT DOCUMENTS

| | | | |
|---|---|---|---|
| 511768 | 8/1939 | United Kingdom | 166/272 |
| 895303 | 5/1962 | United Kingdom | 166/272 |

*Primary Examiner*—Stephen J. Novosad
*Attorney, Agent, or Firm*—Carl G. Ries; Thomas H. Whaley; Walter D. Hunter

[57] ABSTRACT

A method for recovering hydrocarbons from a subterranean formation in which steam, for example, is injected into the formation via an injection well to drive the hydrocarbons toward a spaced production well. Water injected via the production well into an upper horizon of the formation is passed downwardly through the formation about the production well and then back into the production well at a lower horizon in the formation. A mixture of displaced hydrocarbons and injected water are then coproduced at the lower horizon thru the production well after which the hydrocarbons are recovered from the mixture. Optionally, a minor amount of a sulfated interfacial tension reducer may be introduced with the steam to promote increased hydrocarbon recovery.

3 Claims, 1 Drawing Figure

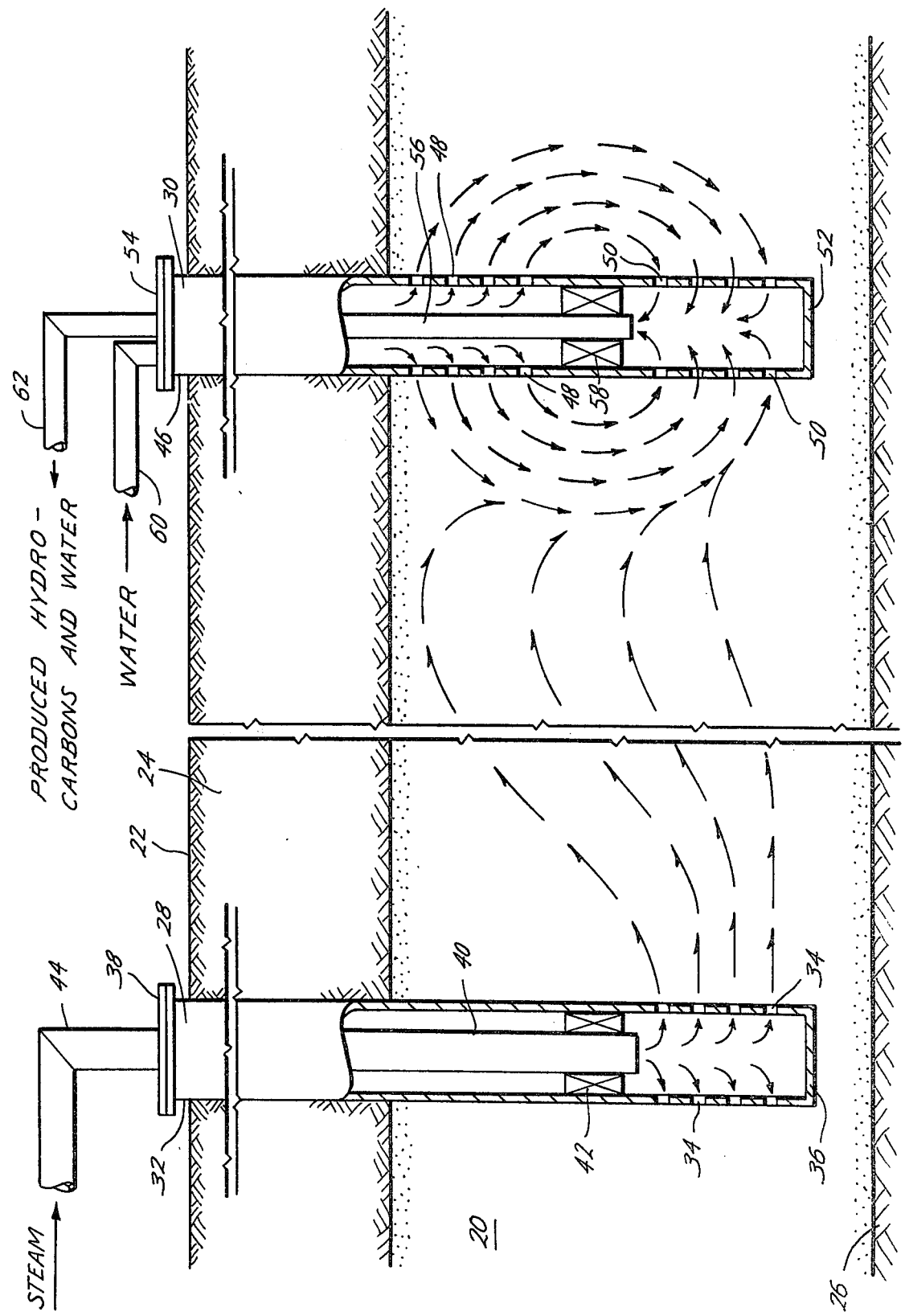

4,133,384

STEAM FLOODING HYDROCARBON RECOVERY PROCESS

BACKGROUND OF THE INVENTION

1. Field of the Invention

This invention relates to a steam flooding process for the recovery of hydrocarbons from a subterranean formation. More particularly, this invention relates to a recovery process in which hydrocarbons driven toward a production well by means of a fluid, such as steam or a mixture of steam and carbon dioxide, which is injected into the formation via an injection well are coproduced from a lower horizon of the formation via the production well along with water introduced into the upper horizon of the formation.

2. Prior Art and Background

The production of hydrocarbon products is usually achieved by drilling into a hydrocarbon-bearing formation and employing one of the art-recognized recovery methods for the recovery of hydrocarbons therein. Present recovery techniques, however, usually result in the recovery of only a minor portion of the petroleum materials present in the formation and this is particularly true with reservoirs of viscous crudes. Even when employing improved secondary recovery practices as much as 50-75 percent of the original hydrocarbon may be left in place and even more in the case of viscous hydrocarbon reservoirs.

A variety of processes well known in the art, such as water flooding, steam flooding, miscible flooding, etc. have been employed after natural drive of the reservoir has been depleted in order to recover additional oil from the formation. The application of these techniques which are sometimes referred to as secondary recovery methods permits additional hydrocarbons to be removed from the partially depleted formations. One of the more widely practiced secondary recovery methods is that of the so-called steam flooding process. Steam flooding is notably well-suited for secondary recovery operations since the energy contained in the fluid effectively reduces the viscosity of the hydrocarbons and permits production thereof. In order to realize the maximum viscosity reduction of the hydrocarbons, the injected steam should impart the maximum heat to the formation, as is consistent with economical steam generator design, and provide a uniform penetration of the formation.

Despite the advantages of steam flooding operations, under certain circumstances present-day steam flooding techniques fail in many instances to permit recovery of large quantities of hydrocarbons contained in the formation. As a result, a number of modified steam injection processes have been proposed including a "push-pull" technique and throughput methods which have resulted in some instances in additional significant recoveries of crude oil from the reservoirs.

One of the main problems faced in the recovery of hydrocarbons by steam flooding is early breakthrough of steam into the production well since at that time no more oil is produced. Breakthrough generally is caused by the tendency of the steam to move updip and to flow only through the upper part of the formation.

There is a definite need in the art, therefore, for a steam flooding process in which steam breakthrough into the production well is prevented thus greatly increasing the amount of oil recovered.

Another disadvantage of steam flooding is that some distillation in the formation takes place with the result that lighter, more volatile solutions of the in-place hydrocarbons are recovered leaving behind the more viscous oil with an increased asphaltene and aromatic content. Thus, the nature of the residual oil left behind after an initial period of steam flooding of a formation is probably different from that of the original oil composition in place because of distillation effects, etc. and the efficiency of the removal process gradually declines.

Accordingly, it is an object of the present invention to overcome the disadvantages of the prior art steam flooding process by providing an efficient, improved steam flooding method for hydrocarbon recovery.

BRIEF SUMMARY OF THE INVENTION

This invention provides an improved method of recovering hydrocarbons from a subterranean hydrocarbon bearing formation wherein the formation is penetrated by an injection well and a production well which comprises:

a. injecting steam or a mixture of steam and carbon dioxide via the injection well into the said hydrocarbon-bearing formation to drive said hydrocarbons toward said production well, b. injecting water via the production well into the surrounding formation at an upper horizon of the said hydrocarbon bearing formation and passing said water downwardly through the formation about the production well to a lower horizon in the said formation and then back into the production well from the surrounding formation at the lower horizon, c. producing a mixture of the displaced hydrocarbons and the injected water at the lower horizon via the said production well and recovering hydrocarbons from said mixture.

DETAILED DESCRIPTION OF THE INVENTION

The FIGURE schematically illustrates a method in accordance with this invention in which hydrocarbons are recovered by steam flooding and in which steam breakthrough into the production well is prevented.

It is known that steam does not displace reservoir oil with good volumetric efficiency due to one or a combination of the flowing reasons:

1. Gravity segragation due to the low density of steam as compared to condensate, oil and interstitial water;

2. Whenever gas saturation and gas permeability exists, steam preferentially displaces the in place gas and flows to producing wells via the gas channels present at the initiation of steam injection;

3. For formations having a high degree of permeability distribution, the steam channels to producing wells via the higher permeability strata.

In practice the steam front as it advances from the injection well toward the production well becomes tilted. As a result, early breakthrough of steam is experienced with no more oil production from the well.

The above remarks apply to reservoirs having high vertical permeability. For zones having an appreciable degree of vertical permeability distribution, steam can channel through the most permeable path or paths very early and result in low volumetric oil displacment efficiency.

Whenever a gas saturation exists prior to steam injection, the steam displaces the in place gas first. If the gas saturation is above the critical gas saturation (about 5%) gas permeability exists and is maintained by gas (steam) displacing gas. As a result, the steam breaks through into producing wells with low displacement efficiency.

As previously pointed out whenever steam breaks through into a producing well or wells no more oil is produced. Surprising, it has been found that it is possible to regain and maintain oil production by cooling the formation adjacent the well according to the process of this invention. Temperature reduction of the formation will condense all steam, reduce the gas saturation to zero by condensing the steam. The initial in place gas at this point, i.e., the formation adjacent the producing well, has already been produced and reduction of gas (steam) saturation to zero simultaneously reduces the gas (steam) permeability to zero with no steam production.

Cooling the formation adjacent the producing well can be accomplished as set out in the process of this invention by single well bore cycling using water as the cycle fluid. In this process water is injected into the top of the zone while displaced hydrocarbons and injected water are produced from near the bottom of the zone, each interval being separated by a packer. Preferably, in this process injection and production rates are adjusted so that all steam adjacent the well bore is condensed and production contains cycle fluid, i.e., water and displaced hydrocarbons. Production profile surveys are utilized for determining the interval or intervals flowing to a well bore and to determine the section in which steam is flowing, a temperature survey is conducted.

If desired, the steam injected via the injection well may contain from about 0.01 to about 0.10 weight percent or more of an interfacial tension reducer in order to increase the oil recovery. Alkaline fluids may also be injected via the injection well in the process of this invention. The injection fluids are made alkaline by the addition of sodium hydroxide or potassium hydroxide to the steam in an amount sufficient to give a concentration of about 0.01 to about 0.1 weight percent based on the total fluid weight.

Interfacial tension reducers which are highly useful in the process of the invention include sulfated compounds of the formula:

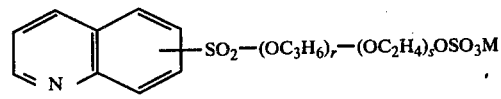
(I)

wherein r is an integer of from 2 to about 5, s is an integer of from 8 to about 60, wherein the sum of r plus s is not more than 55 and M is selected from the group consisting of hydrogen, sodium, potassium, and the ammonium ion and compounds of the formula:

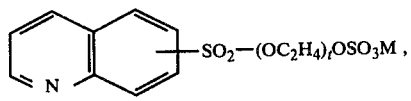
(II)

wherein t is an integer of from 8 to about 40, and M has the same meaning as previously described.

Interfacial tension reducers of this type can be formed by sulfating compounds of the formula:

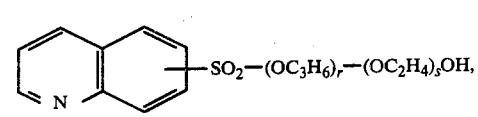
(III)

and where r and s have the same meaning as before and compounds of the formula:

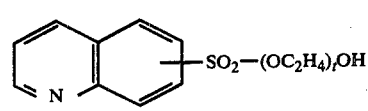
(IV)

where t has the same meaning as before, batchwise with chlorosulfonic acid in a glass lined kettle at about 30° C. followed by reaction with the corresponding base, if desired. The corresponding starting compounds (II) can be prepared in the same manner as described in U.S. Pat. No. 3,731,741 employing as starting aromatic compounds 8-quinolinesulfonyl chloride, 6-quinolinesulfonyl bromide, etc., as initiators and reacting the initiator first with the necessary amount of propylene glycol of the required molecular weight followed by the necessary amount of ethylene glycol of the required molecular weight. The quinoline starting material may also be substituted by other innocous groups such as alkoxy of from 1 to 4 carbon atoms, alkyl, etc.

In the FIGURE a hydrocarbon-bearing formation is shown together with a suitable apparatus for conducting the recovery method of this invention. It should be noted that other formations and other arrangements of apparatus may be utilized in carrying out the steps of this method. In the FIGURE there is shown a hydrocarbon-bearing formation 20 situated below the earth's surface 22 covered by overburden 24 and supported by strata 26.

Formation 20 is penetrated by spaced-apart injection well 28 and production well 30. Injection well 28 is equipped with casing 32 and is provided with perforations 34 within the lower part of hydrocarbon-bearing formation 20. The bottom of casing 28 is sealed by means of casing shoe 36 and wellhead 38 encloses the top of casing 32. Injection well 28 is equipped with tubing 40 which extends downward from wellhead 38 through packer 42 located just above the uppermost of perforations 34 and tubing 40 terminates adjacent the said perforations 34. Inlet steam line 44 is connected to tubing 40 at wellhead 38. During the operation of this process steam which is introduced into tubing 40 via steam inlet line 44 passes into the producing formation through perforations 34.

Production well 30 is equipped with casing 46 and is provided with upper perforations 48 within the upper part of hydrocarbon-bearing formation 20 and lower perforations 50 within the lower part of hydrocarbon-bearing formation 20. The bottom of casing 46 is sealed by means of casing shoe 52 and wellhead 54 encloses the top of casing 46. Production well 30 is equipped with tubing 56 which extends downward from wellhead 54 through packer 58 which is placed in casing 46 between upper perforations 48 and lower perforations 50 thus dividing the production well 30 into two separate fluid handling areas, i.e., an upper area and a lower area. Tubing 56 terminates adjacent the lower perforations 50. Production well 30 is provided with water inlet line 60 which passes through wellhead 54 into the annulus section between tubing 56 and casing 46 and above packer 58. During operation of this process water is introduced from the earth's surface via line 60, down the annulus space above packer 58; i.e., the upper fluid handling area, and then out into the formation through upper perforations 48. The water thus introduced passes downwardly through the formation about the production well and simultaneously contacts and condenses any steam originally introduced into the formation via the injection well which breaks through and arrives in the vicinity of the production well. The resulting fluid which includes hydrocarbons displaced through the formation is produced from the lower horizon of the surrounding hydrocarbon-bearing formation 20 through the lower perforations 50 into production well 30. The produced fluid is conducted to the earth's surface 22 through tubing 56 and finally is conveyed via line 62 to a suitable hydrocarbon recovery facility.

The following example illustrates one embodiment of this invention and is to be considered not limitative.

EXAMPLE I

An oil reservoir in South Texas has the following properties.

| Depth | 2,000 ft. |
|---|---|
| Thickness | 50 ft. |
| Porosity | 35% |
| Permeability | |
| Horizontal | 3.0 darcies |
| Vertical | 2.5 darcies |
| Initial Saturation | |
| Oil | 80% |
| Water | 20% |
| Oil Gravity | 14° API |

The above-described formation is produced by solution gas drive yielding only 10% of the in-place oil and resulting in the following saturations:

Oil: 72%
Gas: 8%
Water: 20%

The field is then converted to a steam flood utilizing a five-spot pattern basis with a central injection well and with the producing wells 750 feet apart. Due to good vertical permeability the injected steam migrates to the top of the reservoir where it breaks through into the producing wells. There is some productivity increase shortly after steam injection is initiated, the average rate increasing from about 5 to 50 barrels of oil per day (i.e., BOPD) per well. However, after about one month's operation steam break through is experienced and the production is reduced to only 2 BOPD per well. During this initial short period of well stimulation less than 0.1% of the in place oil is recovered.

A temperature survey using vertically situated thermocouples shows that steam broke through the producing wells near the top of the pay. The production wells are then completed as shown in the FIGURE. The wells are produced through the tubing, by flow and/or pump, and water is injected down the annulus between casing and tubing. Steam and 515 psia, 470° F. (quality = 80%) is injected into the formation via the tubing and casing perforations of the injection well. After adjusting, the injection and the producing rates are stabilized at 100 barrels of water per day injection, with production of 300 barrels of total fluid per day containing 150 barrels of oil, 100 barrels of injected water and 50 barrels of water from the formation. The bottom hole flowing temperature is below steam temperature for the pressure at that location and no steam flows to the well bore. The overall rate is maintained until the net oil production becomes uneconomical. After this condition develops in all producing wells the steam flood is abandoned. Oil recovered during steam flooding is about 60% of the original oil in place bringing the total recovery to about 70%.

In certain fields steam breakthrough may occur in the production wells near the bottom of the oil zone. In such cases water is injected through the tubing to a point below the packer set between the upper and lower casing perforations and production is through the upper casing perforations via the annulus. If the well will not flow, it may be necessary to use a cross-over packer for pumping the well while injecting water.

What is claimed is:

1. A method for recovering hydrocarbons from a subterranean, hydrocarbon-bearing formation penetrated by an injection well and a production well which comprises:

a. injecting via the injection well a fluid selected from the group consisting of steam and a mixture of steam and carbon dioxide into the said hydrocarbon-bearing formation to drive said hydrocarbons toward said production well, b. injecting water via the production well into the surrounding formation at an upper horizon of the said hydrocarbon-bearing formation, and passing said water downwardly through the formation about the production well to a lower horizon in the said formation and then back into the production well from the surrounding formation at the lower horizon, c. producing a mixture of the displaced hydrocarbons and the injected water at the lower horizon via the mixture, and wherein the said fluid injected in (a) contains from about 0.01 to about 0.10 weight percent of an interfacial tension reducer selected from the group consisting of a compound of the formula:

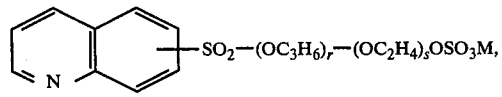

wherein r is an integer of from 2 to about 5, s is an integer of from 8 to about 60, wherein the sum of r plus s is not more than 55 and M is selected from the group consisting of hydrogen, sodium, potassium and the ammonium ion, and a compound of the formula:

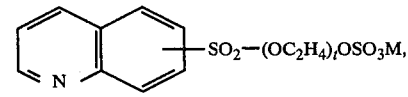

wherein t is an integer of from 8 to about 40, and M has the same meaning as previously described.

2. The method of claim 1 wherein the said fluid injected in (a) is steam.

3. The method of claim 1 wherein the said fluid is steam and carbon dioxide containing from about 5 to about 40 percent by volume of carbon dioxide.

* * * * *